US009142041B2

(12) United States Patent
Yaras et al.

(10) Patent No.: US 9,142,041 B2
(45) Date of Patent: Sep. 22, 2015

(54) DISPLAY APPARATUS CONFIGURED FOR SELECTIVE ILLUMINATION OF LOW-ILLUMINATION INTENSITY IMAGE SUBFRAMES

(71) Applicant: Pixtronix, Inc., San Diego, CA (US)

(72) Inventors: Fahri Yaras, Chelsea, MA (US); Edward Buckley, Melrose, MA (US)

(73) Assignee: Pixtronix, Inc., San Diego, CA (US)

( * ) Notice: Subject to any disclaimer, the term of this patent is extended or adjusted under 35 U.S.C. 154(b) by 68 days.

(21) Appl. No.: 13/939,789

(22) Filed: Jul. 11, 2013

(65) Prior Publication Data
US 2015/0015599 A1  Jan. 15, 2015

(51) Int. Cl.
*G09G 3/20* (2006.01)
*G06T 11/00* (2006.01)
*G09G 3/34* (2006.01)

(52) U.S. Cl.
CPC ............ *G06T 11/001* (2013.01); *G09G 3/2037* (2013.01); *G09G 3/3413* (2013.01); *G09G 3/3426* (2013.01); *G09G 3/3433* (2013.01); *G09G 2310/0235* (2013.01); *G09G 2320/0271* (2013.01); *G09G 2320/0646* (2013.01); *G09G 2330/021* (2013.01); *G09G 2360/16* (2013.01)

(58) Field of Classification Search
CPC . G09G 3/2037; G09G 3/3413; G09G 3/3426; G09G 3/3433; G09G 5/02; G09G 2310/0235; G09G 2320/0646; G09G 2320/0271; G09G 2360/16; G09G 2330/021
USPC ..................... 345/84, 102, 204, 211, 212, 600
See application file for complete search history.

(56) References Cited

U.S. PATENT DOCUMENTS

| 6,353,424 | B2 | 3/2002 | Kasahara et al. | |
|---|---|---|---|---|
| 6,570,554 | B1 * | 5/2003 | Makino et al. | 345/102 |
| 6,587,248 | B1 * | 7/2003 | Gyoten | 359/245 |
| 7,679,583 | B2 | 3/2010 | Chung et al. | |
| 8,179,341 | B2 | 5/2012 | Yamada | |

(Continued)

FOREIGN PATENT DOCUMENTS

JP        H1165521 A    3/1999

OTHER PUBLICATIONS

International Search Report and Written Opinion—PCT/US2014/045306—ISA/EPO—Jan. 14, 2015.

(Continued)

*Primary Examiner* — Premal Patel
(74) *Attorney, Agent, or Firm* — Edward A. Gordon; Foley & Lardner LLP

(57) ABSTRACT

This disclosure provides systems, methods and apparatus for improving power efficiency of display devices. Control logic of a display device can use content adaptive backlight control (CABC) for displaying certain image frames with reduced illumination intensity. CABC can be used to determine a scaling factor for scaling up pixel values in an image frame and for scaling down the illumination intensity of a backlight used for illuminating the image frames. The control logic can determine a number of image subframes that have been rendered imperceptible to the human visual system (HVS) due to the reduced illumination intensity of the backlight, and refrain from displaying the determined number of image subframes. The control logic can utilize the additional time made available as a result of not displaying the determined number of subframes to further improve the power efficiency of the display device and/or improve image quality.

23 Claims, 8 Drawing Sheets

(56) References Cited

U.S. PATENT DOCUMENTS

| | | |
|---|---|---|
| 2004/0155891 A1 | 8/2004 | Kang |
| 2005/0083255 A1 | 4/2005 | Son |
| 2005/0243028 A1 | 11/2005 | Usui et al. |
| 2006/0273987 A1* | 12/2006 | Suzuki et al. ............... 345/63 |
| 2007/0025613 A1* | 2/2007 | Lee et al. ................. 382/162 |
| 2007/0064008 A1 | 3/2007 | Childers |
| 2007/0205969 A1* | 9/2007 | Hagood et al. ............. 345/84 |
| 2008/0217509 A1 | 9/2008 | Weatherford |
| 2009/0070606 A1* | 3/2009 | Chen et al. ................ 713/320 |
| 2011/0157244 A1 | 6/2011 | Nakano et al. |
| 2012/0075536 A1 | 3/2012 | Uehara et al. |
| 2013/0293598 A1* | 11/2013 | Ishihara .................. 345/690 |

OTHER PUBLICATIONS

Greef P.E., et al., "39.1: Adaptive Dimming and Boosting Backlight for LCD-TV Systems", SID 2007, International Symposium, Society for Information Display, Los Angeles, USA, vol. XXXVIII, May 20, 2007, pp. 1332-1335, XP007013259.

* cited by examiner

DISPLAY APPARATUS CONFIGURED FOR SELECTIVE ILLUMINATION OF LOW-ILLUMINATION INTENSITY IMAGE SUBFRAMES

TECHNICAL FIELD

This disclosure relates to the field of displays, and in particular, to image formation processes used by displays.

DESCRIPTION OF THE RELATED TECHNOLOGY

Many display architectures rely in part on time division schemes to provide gray scale images. In such schemes, an image frame is broken down into a set of subframes, which are sequentially displayed to a viewer within the amount of time allocated to the display of an image frame. In general, the more subframes a display can display in the allocated time, the large number of gray scale levels the display is able to generate. Additional subframes also can be used to help mitigate adverse image artifacts such as dynamic false contouring (DFC). Displays that also employ field-sequential color formation schemes may generate and separately display even more subframes to account for each color primary employed by the display.

Using additional subframes, though, decreases the energy efficiency of a display. As the number of subframes a display employs to display a given image frame increases, the duty cycle of its light sources typically decreases. As such, to maintain sufficient brightness, the display must operate its light sources at higher intensities during the shorter durations in which they are on. Such higher intensity emission tends to be less power efficient. Moreover, displays must expend energy to load each subframe into the display. Thus many displays are forced to make a tradeoff between power efficiency and image quality. For mobile devices, where battery life if highly valued, this tradeoff often results in reduced image quality.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus including an input, subfield derivation logic and output logic. The input is capable of receiving image data associated with an image frame. The subfield derivation logic is capable of deriving at least one color subfield for the received image frame, where each of the at least one color subfields identifies a color intensity value with respect to each of a plurality of light modulators in a display for the received image frame. The output logic is capable of determining a number of subframes to output for at least one of the derived color subfields based in part on a light source intensity value used for illuminating the at least one color subfield and a brightness value associated with the at least one derived color subfield, and of controlling the timing of outputting the number of subframes for the at least one color subfield.

In some implementations, the apparatus further includes content adaptive backlight control (CABC) logic capable of calculating the light source intensity value for the at least one color subfield and of adjusting the color intensity values identified in the at least one color subfield based on the calculated light source intensity value. In some such implementations, the brightness value includes the average color intensity value of the at least one color subfield prior to such color intensity values being adjusted by the CABC logic. In some implementations, the apparatus further includes subframe generation logic capable of generating a plurality of subframes for each of the at least one derived color subfields, where each generated subframe indicates the states of each of the plurality of light modulator in the display.

In some implementations, the output logic determines the number of subframes to output for the at least one color subfield by determining a number of the generated subframes for the at least one color subfield not to display. In some implementations, the output logic further includes error diffusion logic capable of adjusting at least one subframe generated for the at least one color subfield based on a determination to not display a subframe. In some implementations, determining the number of generated subframes for the at least one subfield not to display includes determining the number heuristically.

In some implementations, determining the number of generated subframes for the at least one subfield not to display includes determining the number based on a drop metric $D=1/(I_{AVG} \times F)$, where $I_{AVG}$ is the brightness value associated with the at least one subfield and F is the light source intensity value. In some implementations, the drop metric is expressed as $D=I_{AVG}/F$. In some implementations, the light source intensity value is an intensity scaling factor.

In some implementations, the apparatus further includes a display, a processor that is capable of communicating with the display, the processor being capable of processing image data, and a memory device that is capable of communicating with the processor.

In some implementations, the display further includes a driver circuit capable of sending at least one signal to the display, and a controller capable of sending at least a portion of the image data to the driver circuit. In some implementations, the display further includes an image source module capable of sending the image data to the processor. In some implementations, the image source module includes at least one of a receiver, transceiver, and transmitter, and an input device capable of receiving input data and to communicate the input data to the processor.

Another innovative aspect of the subject matter described in this disclosure can be implemented in a method of forming an image on a display. The method includes receiving image data associated with an image frame. The method also includes deriving at least one color subfield for the received image frame, where each of the at least one color subfields identifies a color intensity value with respect to each of a plurality of light modulators in a display for the received image frame. The method further includes generating a plurality of subframes for each of the at least one derived color subfields, where each generated subframe indicates the states of each of the plurality of light modulators in the display. The method also includes determining a number of subframes to output for at least one of the derived subfields based in part on a light source intensity value used for illuminating the at least one color subfield and a brightness value associated with the at least one color subfield, and controlling the timing of outputting the number of subframes for the at least one color subfield.

In some implementations, the method further includes calculating the light source intensity value for the at least one color subfield and adjusting the color intensity value identified in the at least one color subfield based on the calculated light source intensity value. In some implementations, the brightness value includes the average color intensity value of the at least one color subfield prior to adjusting the color intensity value based on the calculated light source intensity value.

In some implementations, determining the number of subframes to output includes determining a number of subframes not to be displayed. In some implementations, controlling the timing of outputting the number of subframes is based on error diffusion. In some implementations, the light source intensity value is an intensity scaling factor.

Another innovative aspect of the subject matter described in this disclosure can be implemented in an apparatus that includes input means for receiving image data associated with an image frame. The apparatus further includes subfield derivation means for deriving at least one color subfield for the received image frame, where each of the at least one color subfields identifies a color intensity value with respect to each of a plurality of light modulators in a display for the received image frame. The apparatus also includes output means for determining a number of subframes to output for at least one of the derived color subfields based in part on a light source intensity value used for illuminating the at least one color subfield and a brightness value associated with the at least one derived color subfield, and controlling means for controlling the timing of outputting the number of subframes for the at least one color subfield.

In some implementations, the apparatus further includes content adaptive backlight control (CABC) means for calculating the light source intensity value for the at least one color subfield and to adjust the color intensity values identified in the at least one color subframe based on the calculated light source intensity value.

In some implementations, the apparatus further includes subframe generation means for generating a plurality of subframes for each of the at least one derived color subfields, where each generated subframe indicates the states of each of the plurality of light modulator in the display.

In some implementations, the output logic means determines the number of subframes to output for the at least one color subfield by determining a number of the generated subframes for the at least one color subfield not to display.

Another innovative aspect of the subject matter described in this disclosure can be implemented in a non-transitory computer readable storage medium having instructions encoded thereon, which when executed by a processor cause the processor to perform a method for displaying an image. The method can include receiving image data associated with an image frame. The method further includes deriving at least one color subfield for the received image frame, where each of the at least one color subfields identifies a color intensity value with respect to each of a plurality of light modulators in a display for the received image frame. The method also includes generating a plurality of subframes for each of the at least one derived color subfields, where each generated subframe indicates the states of each of the plurality of light modulators in the display. The method further includes determining a number of subframes to output for at least one of the derived subfields based in part on a light source intensity value used for illuminating the at least one color subfield and a brightness value associated with the at least one color subfield, and controlling the timing of outputting the number of subframes for the at least one color subfield.

In some implementations, the instructions, when executed by the processor, cause the processor to calculate the light source intensity value for the at least one color subfield, and to adjust the color intensity value identified in the at least one color subfield based on the calculated light source intensity value. In some implementations, the brightness value includes the average color intensity value of the at least one color subfield prior to adjusting the color intensity value based on the calculated light source intensity value.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCDs), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
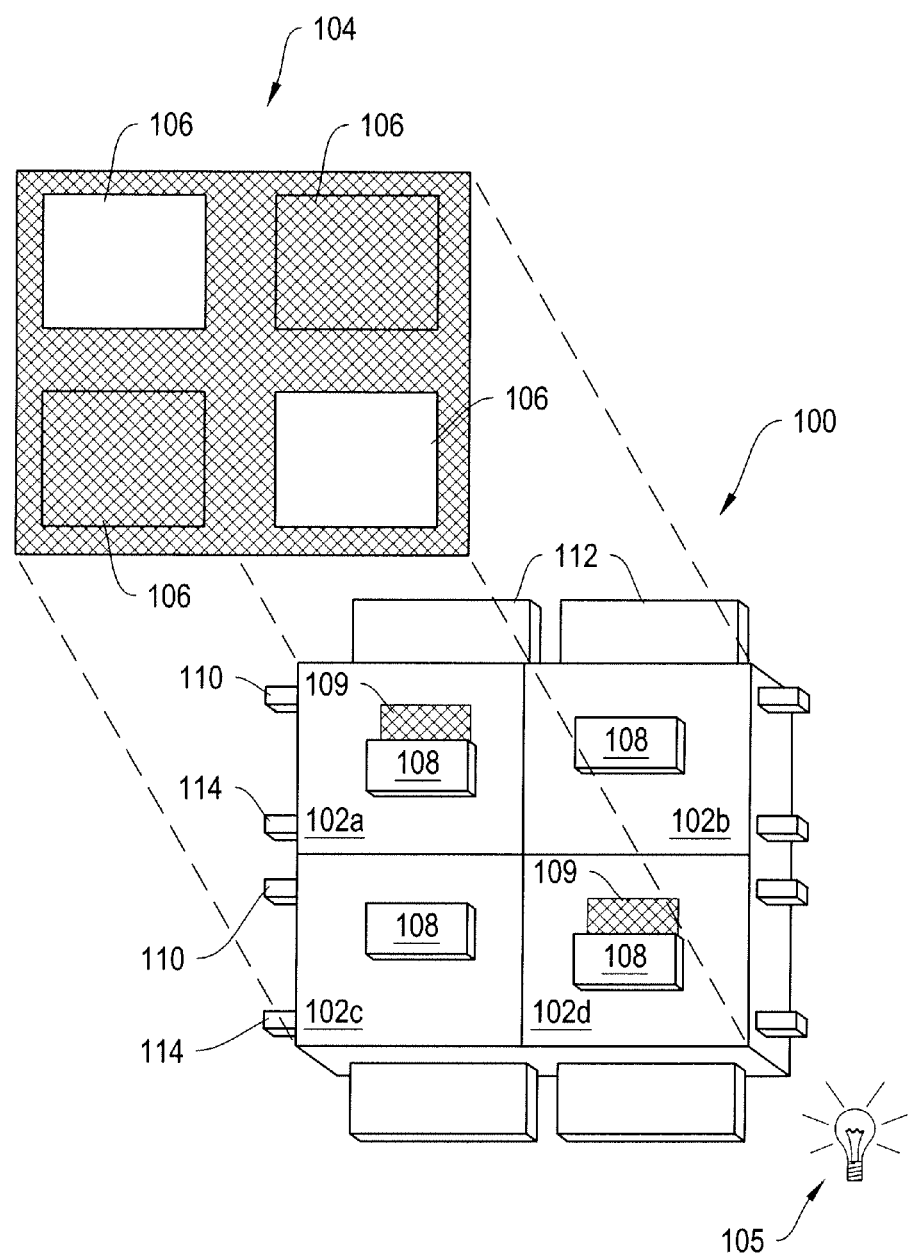
FIG. 1A shows a schematic diagram of an example direct-view microelectromechanical systems (MEMS) based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such as e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

A display can reduce the number of subframes it displays for an image frame by taking advantage of content adaptive backlight control (CABC). Using CABC a display can display certain image frames with a light source operating at a decreased intensity, while commensurately scaling up the intensity values of the pixels in the image frame. If the pixel values are adjusted appropriately, the image frame will be perceived to be the same or substantially the same as if the display had output the image frame with its light source at full intensity and using the original pixel intensity values.

When used by a display that employs coded time division gray scale, in which lower-weighted subframes are illuminated by a light source for only a very short amount of time, the reduced light source intensity used due to CABC processing can render one or more of these lower weighted subframes nearly imperceptible to the human visual system (HVS). Such imperceptible subframes can be identified and excluded without impacting the perception of the image by the viewer.

Particular implementations of the subject matter described in this disclosure can be implemented to realize one or more of the following potential advantages. By incorporating CABC, the illumination intensity of the backlight during display of subframes can be reduced, which in turn improves the power efficiency of the display device. In some implementations, certain subframes, which by the application of CABC may be rendered potentially imperceptible, may be dropped. The dropping of potentially imperceptible subframes, power associated with loading and displaying of such subframes can be saved. Moreover, this power can be saved without substantially impacting the image perceived by a viewer of the display. In some implementations, additional time made available by dropping potentially imperceptible subframes can be allocated to one or more remaining subframes of that color subfield. For the same light output, by increasing the amount of time for which the remaining subframes are displayed, a backlight intensity used to illuminate these subframes can be reduced, thereby reducing overall power consumption.

FIG. 1A shows a schematic diagram of an example direct-view MEMS-based display apparatus 100. The display apparatus 100 includes a plurality of light modulators 102a-102d (generally light modulators 102) arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide a luminance level in an image 104. With respect to an image, a pixel corresponds to the smallest picture element defined by the resolution of image. With respect to structural components of the display apparatus 100, the term pixel refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or backlight so that each pixel can be uniformly illuminated. Transmissive direct-view displays are often built onto transparent or glass substrates to facilitate a sandwich assembly arrangement where one substrate, containing the light modulators, is positioned over the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (such as interconnects 110, 112 and 114), including at least one write-enable interconnect 110 (also referred to as a scan-line interconnect) per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the write-enabling voltage, $V_{WE}$), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, such as transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
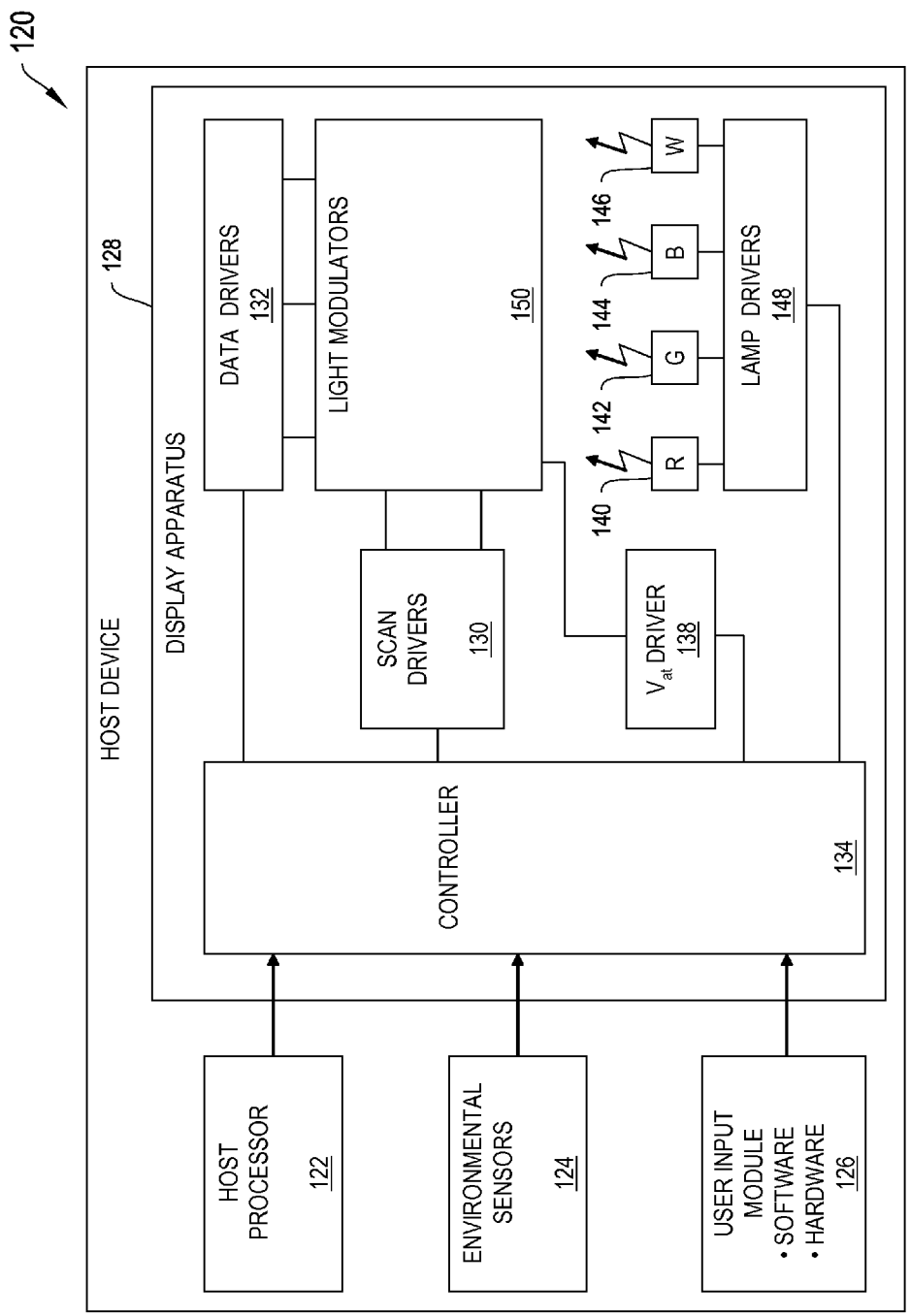
FIG. 1B shows a block diagram of an example host device.

FIG. 1B shows a block diagram of an example host device 120 (i.e., cell phone, smart phone, PDA, MP3 player, tablet, e-reader, netbook, notebook, watch, etc.). The host device 120 includes a display apparatus 128, a host processor 122, environmental sensors 124, a user input module 126, and a power source.

The display apparatus 128 includes a plurality of scan drivers 130 (also referred to as write enabling voltage sources), a plurality of data drivers 132 (also referred to as data voltage sources), a controller 134, common drivers 138, lamps 140-146, lamp drivers 148 and an array 150 of display elements, such as the light modulators 102 shown in FIG. 1A. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the array 150 of display elements, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the controller 134). The controller sends data to the data drivers 132 in a mostly serial fashion, organized in sequences, which may be predetermined, grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 114. In some other implementations, the common drivers 138, following commands from the controller 134, issue voltage pulses or signals to the array 150 of display elements, for instance global actuation pulses which are capable of driving and/or initiating simultaneous actuation of all display elements in multiple rows and columns of the array 150.

All of the drivers (such as scan drivers 130, data drivers 132 and common drivers 138) for different display functions are time-synchronized by the controller 134. Timing commands from the controller coordinate the illumination of red, green, blue and white lamps (140, 142, 144 and 146 respectively) via lamp drivers 148, the write-enabling and sequencing of specific rows within the array 150 of display elements, the output of voltages from the data drivers 132, and the output of voltages that provide for display element actuation. In some implementations, the lamps are light emitting diodes (LEDs).

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array 150 is synchronized with the illumination of the lamps 140, 142, 144 and 146 such that alternate image frames are illuminated with an alternating series of colors, such as red, green, blue and white. The image frames for each respective color are referred to as color subframes. In this method, referred to as the field sequential color (FSC) method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, blue and white.

In some implementations, where the display apparatus 100 is designed for the digital switching of shutters 108 between open and closed states, the controller 134 forms an image by the method of time division grayscale, as previously described. In some other implementations, the display apparatus 100 can provide grayscale through the use of multiple shutters 108 per pixel.

In some implementations, the data for an image 104 state is loaded by the controller 134 to the display element array 150 by a sequential addressing of individual rows, also referred to as scan lines. For each row or scan line in the sequence, the scan driver 130 applies a write-enable voltage to the write enable interconnect 110 for that row of the array 150, and subsequently the data driver 132 supplies data voltages, corresponding to desired shutter states, for each column in the selected row. This process repeats until data has been loaded for all rows in the array 150. In some implementations, the sequence of selected rows for data loading is linear, proceeding from top to bottom in the array 150. In some other implementations, the sequence of selected rows is pseudo-randomized, in order to minimize visual artifacts. And in some other implementations, the sequencing is organized by blocks, where, for a block, the data for only a certain fraction of the image 104 state is loaded to the array 150, for instance by addressing only every $5^{th}$ row of the array 150 in sequence.

In some implementations, the process for loading image data to the array 150 is separated in time from the process of actuating the display elements in the array 150. In these implementations, the display element array 150 may include data memory elements for each display element in the array 150 and the control matrix may include a global actuation interconnect for carrying trigger signals, from common driver 138, to initiate simultaneous actuation of shutters 108 according to data stored in the memory elements.

In alternative implementations, the array 150 of display elements and the control matrix that controls the display elements may be arranged in configurations other than rectangular rows and columns. For example, the display elements can be arranged in hexagonal arrays or curvilinear rows and columns. In general, as used herein, the term scan-line shall refer to any plurality of display elements that share a write-enabling interconnect.

The host processor 122 generally controls the operations of the host. For example, the host processor 122 may be a general or special purpose processor for controlling a portable electronic device. With respect to the display apparatus 128, included within the host device 120, the host processor 122 outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module 126 is controlled by software in which the user programs personal preferences such as deeper color, better contrast, lower power, increased brightness, sports, live action, or animation. In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device 120. The environmental sensor module 124 receives data about the ambient environment, such as temperature and or ambient lighting conditions. The sensor module 124 can be programmed to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figures 2A, 2B:
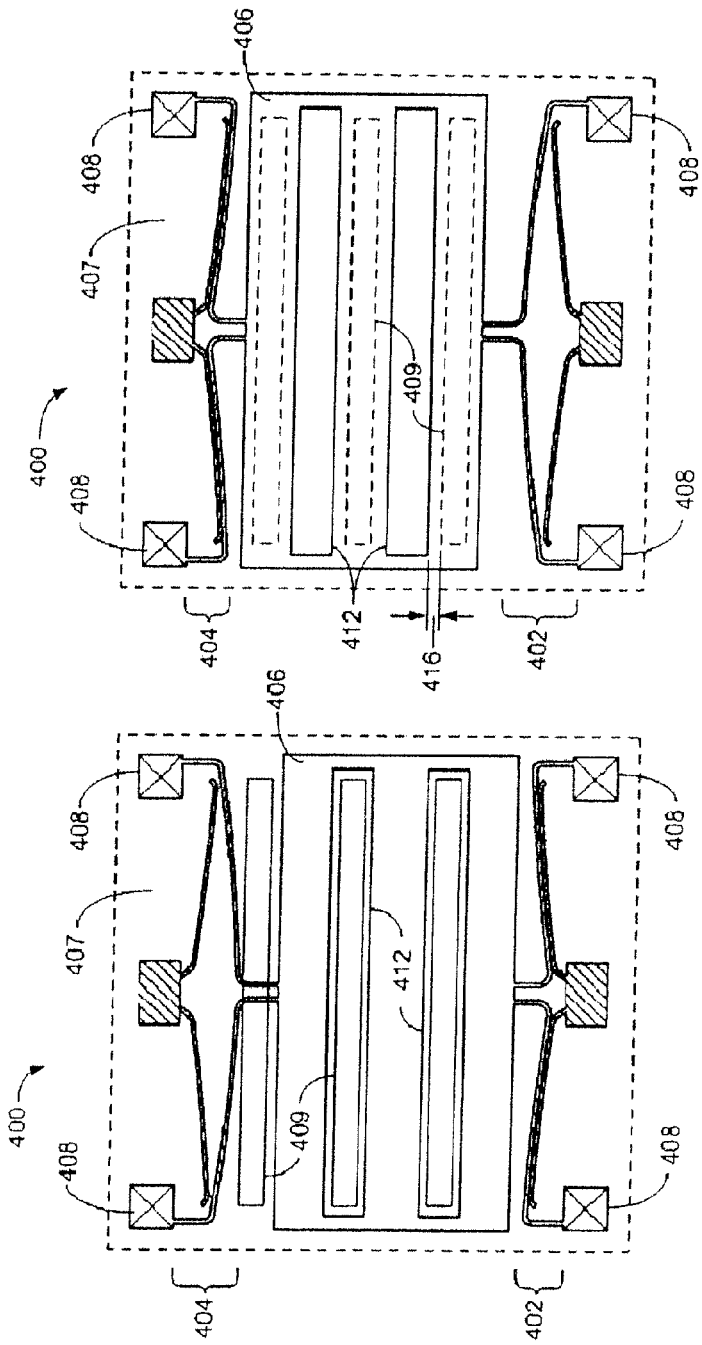
FIGS. 2A and 2B show views of an example dual actuator shutter assembly.

FIGS. 2A and 2B show views of an example dual actuator shutter assembly 400. The dual actuator shutter assembly 400, as depicted in FIG. 2A, is in an open state. FIG. 2B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate.

The shutter 406 includes two shutter apertures 412 through which light can pass. The aperture layer 407 includes a set of three apertures 409. In FIG. 2A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 2B the shutter assembly 400 has been moved to the closed state and, as such, the shutter-open actuator 402 is in its relaxed position, the shutter-close actuator 404 has been actuated, and the light blocking portions of the shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 2B shows an overlap 416, which in some implementations can be predefined, between the edge of light blocking portions in the shutter 406 and one edge of the aperture 409 formed in the aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 3:
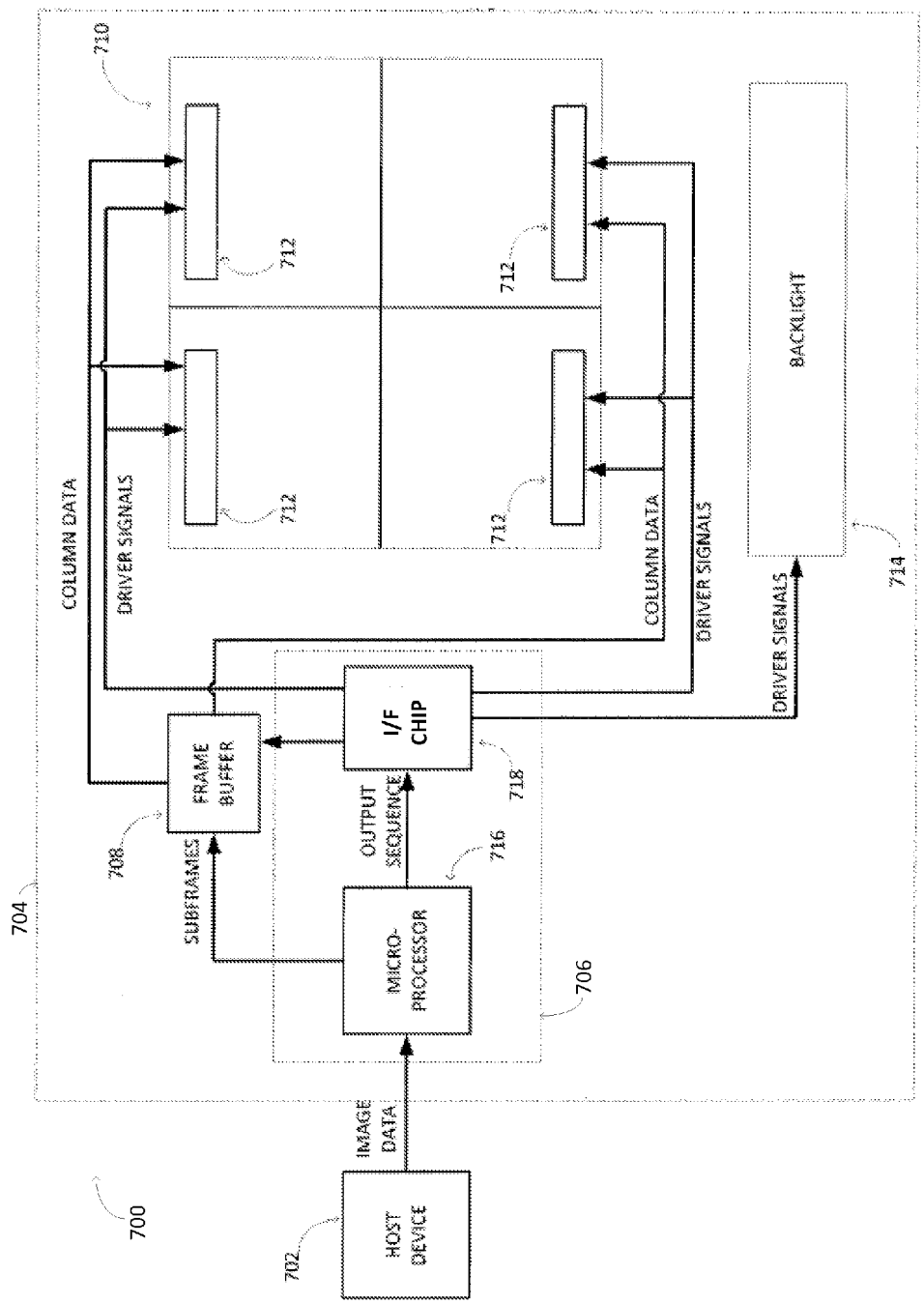
FIG. 3 shows a block diagram of an example display apparatus.

FIG. 3 shows a block diagram of an example display apparatus 700. The display apparatus 700 includes a host device 702 and a display module 704. The host device can be any of a number of electronic devices, such as a portable telephone, a smartphone, a watch, a tablet computer, a laptop computer, a desktop computer, a television, a set top box, a DVD or other media player, or any other device that provides graphical output to a display. In general, the host device 702 serves as a source for image data to be displayed on the display module 704.

The display module 704 further includes control logic 706, a frame buffer 708, an array of display elements 710, display drivers 712 and a backlight 714. In general, the control logic 706 serves to process image data received from the host device 702 and controls the display drivers 712, array of display elements 710 and backlight 714 to together produce the images encoded in the image data. The functionality of the control logic 706 is described further below in relation to FIGS. 4-6.

In some implementations, as shown in FIG. 3, the functionality of the control logic 706 is divided between a microprocessor 716 and an interface (I/F) chip 718. In some implementations, the interface chip 718 is implemented in an integrated circuit logic device, such as an application specific integrated circuit (ASIC). In some implementations, the microprocessor 716 is configured to carry out all or substantially all of the image processing functionality of the control logic 706. In addition, the microprocessor 716 can be configured to determine an appropriate output sequence for the display module 704 to use to generate received images. For example, the microprocessor 716 can be configured to convert image frames included in the received image data into a set of image subframes. Each image subframe can be associated with a color and a weight, and includes desired states of each of the display elements in the array of display elements 710. The microprocessor 716 also can be configured to determine the number of image subframes to display to produce a given image frame, the order in which the image subframes are to be displayed, and parameters associated with implementing the appropriate weight for each of the image subframes. These parameters may include, in various implementations, the duration for which each of the respective image subframes is to be illuminated and the intensity of such illumination. These parameters (i.e., the number of subframes, the order and timing of their output, and their weight implementation parameters for each subframe) can be collectively referred to as an "output sequence."

The interface chip 718 can be configured to carry out more routine operations of the display module 704. The operations may include retrieving image subframes from the frame buffer 708 and outputting control signals to the display drivers 712 and the backlight 714 in response to the retrieved image subframe and the output sequence determined by the microprocessor 716. The frame buffer 708 can be any volatile or non-volatile integrated circuit memory, such as DRAM, high-speed cache memory, or flash memory (for example, the frame buffer 708 can be similar to the frame buffer 28 shown in FIG. 7B). In some other implementations, the interface chip 718 causes the frame buffer 708 to output data signals directly to the display drivers 712.

In some other implementations, the functionality of the microprocessor 716 and the interface chip 718 are combined into a single logic device, which may take the form of a microprocessor, an ASIC, a field programmable gate array (FPGA) or other programmable logic device. For example, the functionality of the microprocessor 716 and the interface chip 718 can be implemented by a processor 21 shown in FIG. 7B. In some other implementations, the functionality of the microprocessor 716 and the interface chip 718 may be divided in other ways between multiple logic devices, including one or more microprocessors, ASICs, FPGAs, digital signal processors (DSPs) or other logic devices.

The array of display elements 710 can include an array of any type of display elements that can be used for image formation. In some implementations, the display elements can be EMS light modulators. In some such implementations, the display elements can be MEMS shutter-based light modulators similar to those shown in FIG. 2A or 2B. In some other implementations, the display elements can be other forms of light modulators, including liquid crystal light modulators, other types of EMS based light modulators, or light emitters, such as OLED emitters, configured for use with a time division gray scale image formation process.

The display drivers 712 can include a variety of drivers depending on the specific control matrix used to control the display elements in the array of display elements 710. In some implementations, the display drivers 712 include a plurality of scan drivers similar to the scan drivers 130, a plurality of data drivers similar to the data drivers 132, and a set of common drivers similar to the common drivers 138, all shown in FIG. 1B. As described above, the scan drivers output write enabling voltages to rows of display elements, while the data drivers output data signals along columns of display elements. The common drivers output signals to display elements in multiple rows and multiple columns of display elements.

In some implementations, particularly for larger display modules 704, the control matrix used to control the display elements in the array of display elements 710 is segmented into multiple regions. For example, the array of display elements 710 shown in FIG. 3 is segmented into four quadrants. A separate set of display drivers 712 is coupled to each quadrant. Dividing a display into segments in this fashion reduces the propagation time needed for signals output by the display drivers to reach the furthest display element coupled to a given driver, thereby decreasing the time needed to address the display. Such segmentation also can reduce the power requirements of the drivers employed.

In some implementations, the display elements in the array of display elements can be utilized in a direct-view transmissive display. In direct-view transmissive displays, the display elements, such as EMS light modulators, selectively block light that originates from a backlight, which is illuminated by one or more lamps. Such display elements can be fabricated on transparent substrates, made, for example, from glass. In some implementations, the display drivers 712 are coupled directly to the glass substrate on which the display elements are formed. In such implementations, the drivers are built using a chip-on-glass configuration. In some other implementations, the drivers are built on a separate circuit board and the outputs of the drivers are coupled to the substrate using, for example, flex cables or other wiring.

The backlight 714 can include a light guide, one or more light sources (such as LEDs), and light source drivers. The light sources can include light sources of multiple primary colors, such as red, green, blue, and in some implementations white. The light source drivers are configured to individually drive the light sources to a plurality of discrete light levels to enable illumination gray scale and/or content adaptive backlight control (CABC) in the backlight. The light guide distributes the light output by light sources substantially evenly beneath the array of display elements 710. In some other implementations, for example for displays including reflective display elements, the display apparatus 700 can include a front light or other form of lighting instead of a backlight. The illumination of such alternative light sources can likewise be controlled according to illumination grayscale processes that incorporate content adaptive control features. For ease of explanation, the display processes discussed herein are described with respect to the use of a backlight. However, it would be understood by a person of ordinary skill that such processes also may be adapted for use with a front light or other similar form of display lighting.

Figure 4:
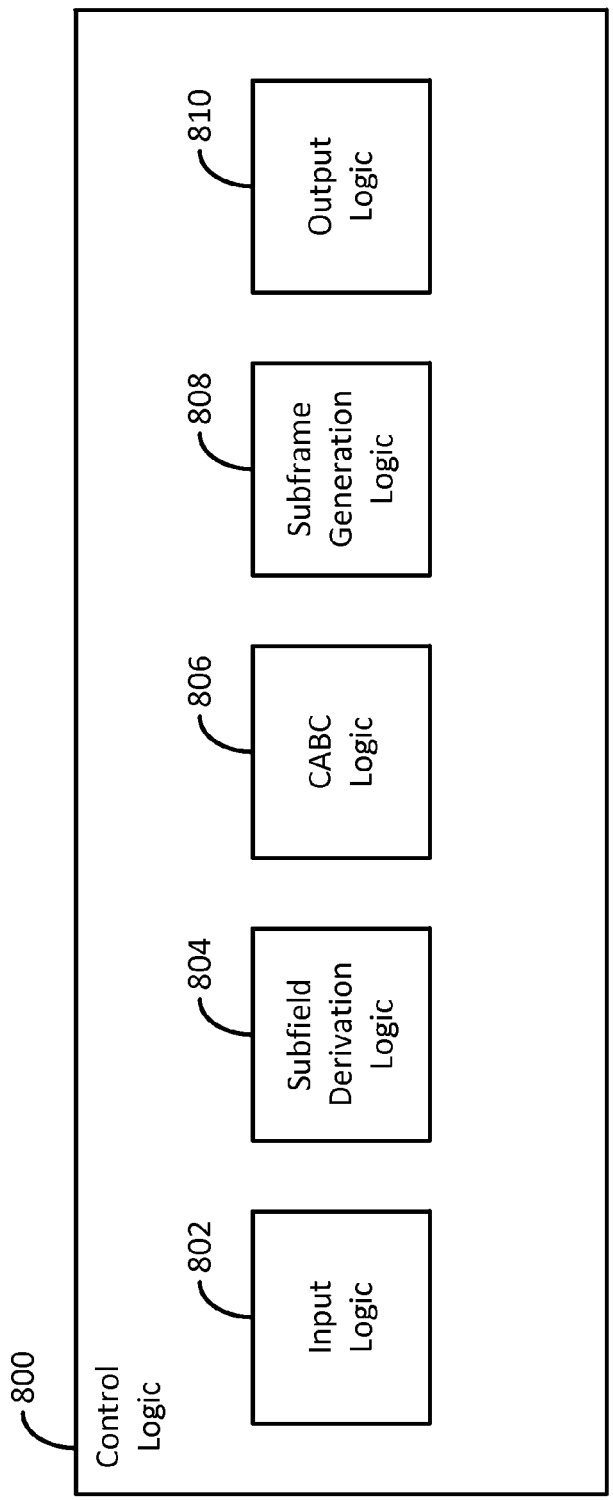
FIG. 4 shows a block diagram of example control logic suitable for use in the display apparatus shown in FIG. 3.

FIG. 4 shows a block diagram of example control logic 800 suitable for use as, for example, the control logic 706 in the display apparatus 700 shown in FIG. 3. More particularly, FIG. 4 shows a block diagram of functional modules executed by the microprocessor 716. Each functional module can be implemented as software in the form of computer executable instructions stored on a tangible computer readable medium, which can be executed by the microprocessor 716. The control logic 800 includes input logic 802, subfield derivation logic 804, content adaptive backlight control (CABC) logic 806, subframe generation logic 808 and output logic 810. While shown as separate functional modules in FIG. 4, in some implementations, the functionality of two or more of the modules may be combined into one or more larger, more comprehensive modules.

In some implementations, when executed by the microprocessor 716, the components of the control logic 800, along with the interface chip 718, display drivers 712, and backlight 714 (all shown in FIG. 3), function to carry out a method for generating an image on a display.

Figure 5:
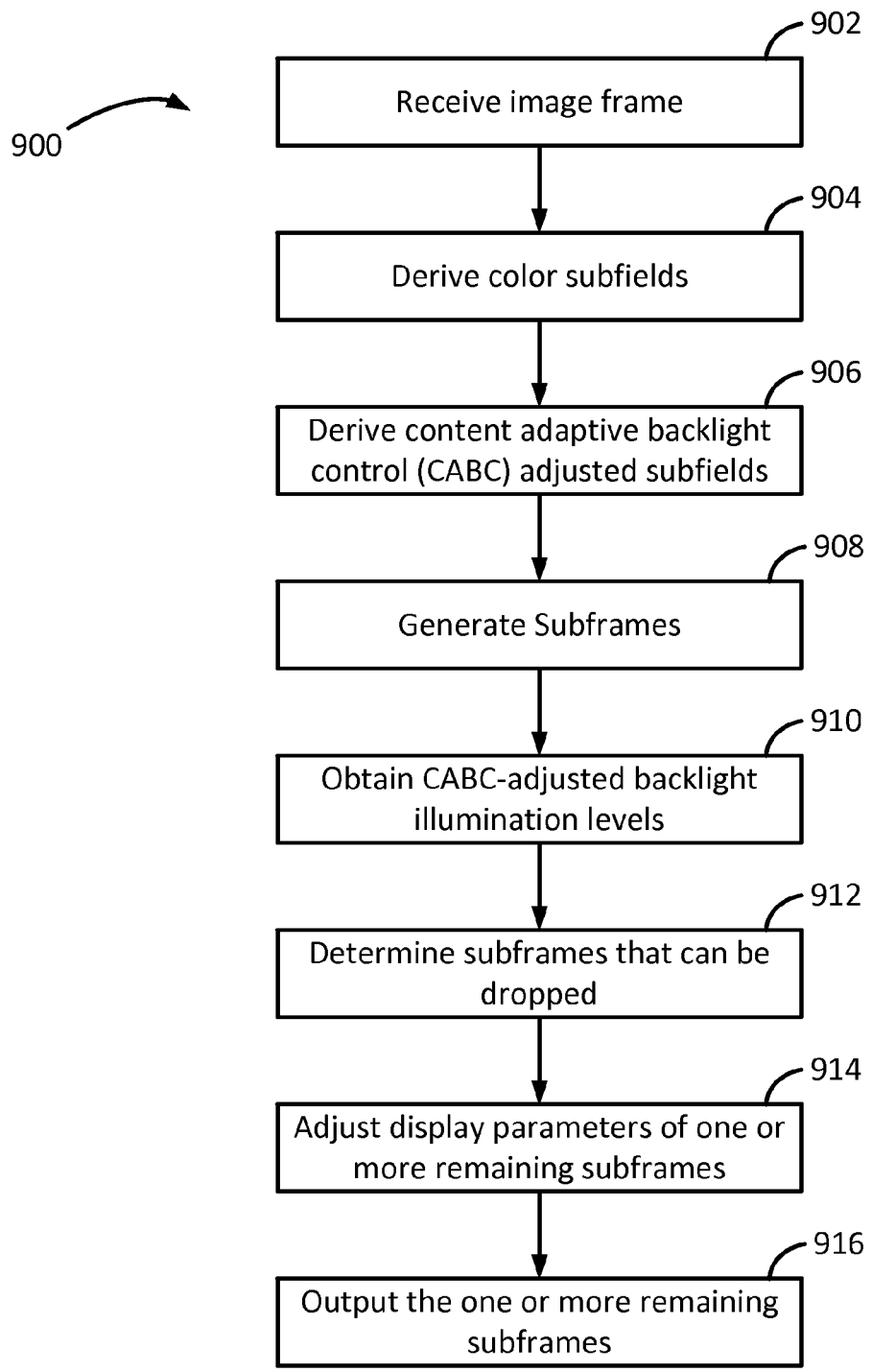
FIG. 5 shows a flow diagram of an example process for generating an image on a display.

FIG. 5 shows a flow diagram of an example method 900 for generating an image on a display. The method 900 includes receiving an image frame (stage 902), deriving color subfields for the image frame (stage 904), deriving CABC-adjusted color subfields (stage 906), generating subframes based on the CABC-adjusted color subfields (stage 908), obtaining CABC-adjusted backlight illumination levels (stage 910), determining subframes that can be dropped (stage 912), adjusting display parameters of one or more remaining subframes (stage 914), and outputting the one or more remaining subframes to a display for presentation (stage 916).

Referring to FIGS. 3-5, the method 900 begins with the input logic 802 receiving image data in the form of image frames (stage 902). Typically, such image data is obtained as a stream of intensity values for the red, green, and blue components of each pixel in an image frame. The intensity values typically are received as binary numbers.

The subfield derivation logic 804 then derives and stores a set of color subfields for the image frame based on the received image data (stage 904). Each color subfield includes for each pixel in the display an intensity value indicating the amount of light to be transmitted by that pixel, for that color, to form the image frame. In some implementations, the subfield derivation logic 804 derives the set of color subfields by segregating the pixel intensity values for each primary color represented in the received image data (i.e., red, green, and blue). In some other implementations, the subfield derivation logic 804 processes the received image data further to derive color subfields for one or more primary colors other than those represented in the image data. For example, the subfield derivation logic 804 may derive a white, cyan, yellow, or magenta subfield, or a subfield for another color that can be formed through illumination of a combination of two or more of the display light sources. Light energy assigned to this additional subfield is then subtracted from the color subfields associated with the input colors. In some implementations, one or more image preprocessing stages, such as gamma correction, also may be carried out by the subfield derivation logic 804 prior to or in the process of deriving the image subfields.

In some implementations, additional processing may be carried out on a derived subfield prior to generation of subframes. For example, in some implementations, the content adaptive backlight control (CABC) logic 806 is configured to generate CABC-adjusted subfields (stage 906). In implementing CABC, pixel intensity values associated with a subfield are scaled up while the output intensity of the backlight for illuminating that subfield is scaled down. The scaling down of the output intensity of the backlight improves the power efficiency of the display apparatus. Moreover, this improved power efficiency is achieved while substantially maintaining image quality. The output intensity of the backlight is typically scaled down by a factor referred to herein as a light source scaling factor F. This light source scaling factor F can be determined in several ways. In particular, two example scaling factors $F_1$ and $F_2$ are discussed below.

In some implementations, the light source scaling factor $F_1$ can be determined using pixel intensity values before and after the application of CABC. In some such implementations, the CABC logic 806 can utilize a CABC lookup table (LUT) to determine CABC-adjusted pixel intensity values. In some such implementations, the CABC-LUT can be populated with a range of CABC-adjusted pixel intensity values for a corresponding range of pixel intensity values. The CABC-adjusted pixel intensity values also may be generated using a CABC-function, such as a polynomial, that can produce a CABC-adjusted pixel intensity value for a given pixel intensity value. The CABC-function can be linear, non-linear, or part linear and part non-linear. Both the CABC-LUT and the CABC-function can ensure that the CABC-adjusted pixel intensity values do not exceed the maximum intensity value that can be displayed in the subfield. For example, if 8-bits are being used to represent a pixel intensity value, then the maximum pixel intensity value cannot exceed 255. Thus, the CABC-LUT and the CABC-function can be configured to ensure that the CABC-adjusted pixel intensity values do not exceed the value 255. In some implementations, the CABC logic 806 can include multiple CABC-LUTs or CABC-functions. The CABC logic 806 selects a CABC-LUT or CABC-function based on one or more characteristics of the input subfield, such as the average pixel intensity value, the maximum intensity value, the median pixel intensity value, etc.

The pixel intensity values prior to applying CABC and the CABC-adjusted pixel intensity values can be used to determine a light source scaling factor $F_1$ for scaling down the output intensity of the backlight 714. For example, in one implementation, a scaling factor $F_1$ can be a ratio of the average pixel intensity value of the derived subfield (i.e., before applying CABC) over the average pixel intensity value of the CABC-adjusted subfield. Typically, the scaling factor $F_1$ can less than or equal to one, and can be passed to the output sequence selection logic 810.

In some implementations, the light source scaling factor $F_2$ can be determined using the pixel intensity values of the derived subfield itself. In some such implementations, the derived subfield can scaled up and the output intensity of the backlight 714 can be scaled down by the same scaling factor, $F_2$. For example, the CABC-adjusted subfield can be generated by identifying a highest pixel intensity value in a subfield and scaling all the pixel values in the subfield such that the pixel value of the pixel with the highest intensity level is equal to the maximum intensity value used by the display. For example, if the pixel intensity values for a color subfield range from 0 to 255, and the highest pixel intensity value in that subfield is 150, then the CABC logic 806 determines the light source scaling factor, $F_2$, as a ratio of the highest pixel intensity value (150) over the maximum intensity value (255). That is, the light source scaling factor $F_2$ equals 150/255. The CABC logic 806 then multiplies all the pixel intensity values in the color subfield by the inverse of the scaling factor $F_2$ to generate CABC-adjusted pixel intensity values (stage 906). For example, if a pixel intensity value is equal to 100, then the CABC logic 806 multiplies 100 by $1/F_2$ (or, using the above example, by 255/150) to generate the corresponding CABC-adjusted pixel intensity value. In this manner, all the pixel intensity values in the subfield are scaled up by the inverse of the light source scaling factor $F_2$, and the output intensity of the backlight 714 is scaled down by the light source scaling factor $F_2$. As mentioned above, the scaling down of the output intensity of the backlight 714 improves the power efficiency of the display apparatus. The CABC-adjusted subfield, scaled up by the scaling factor $F_2$, can be processed by the subframe generation logic 808 discussed below.

In some implementations, the scaling factor F may be determined differently than set forth above. For example, in some implementations, the numerator of the ratio representing the scaling factor F discussed above, can be an average or another function of some or all pixel intensity values in the subfield instead of the highest of all pixel values. In some implementations, the denominator can be a value higher than the maximum intensity value a pixel can assume in the subfield. In some other implementations, the scaling factor F may be an arbitrary value independent of the pixel intensity values in the subfield.

The subframe generation logic 808 converts the CABC-adjusted subfields processed by the CABC logic 806, into sets of subframes (stage 908). In some implementations, which employ field sequential image formation color techniques, the subframe generation logic 808 can generate one or more subframes per color subfield. For example, if the subfield derivation logic 804 generates color subfields for red, green, blue, and white, then the subframe generation logic 808 can generate one or more subframes for each of the four color subfields. Each subframe includes a subframe image that is to be displayed for certain duration of time. The subframe image is displayed by controlling the states (such as transmissive, non-transmissive, or partially transmissive) of light modulators associated with the pixels. The light modulators are then illuminated by a backlight with the corresponding color. The subframes are displayed in sequence in quick succession such that the viewer perceives the series of subframe images as a single image.

The subframe generation logic 808 can employ various time division gray scale techniques to determine the number of subframes for each color subfield, the duration of each of the subframes, and the order of their presentation to a viewer. For example, the subframe generation logic 808 can employ coded time division gray scale technique with weighted subframes, in which multiple subframes with unequal durations are generated for each color subfield. The state of the light modulators during each subframe can be determined based on the CABC-adjusted pixel intensity values. In some implementations, the subframe generation logic 808 can use a codeword lookup table (LUT) to obtain the light modulator states for the pixels during every subframe. The subframe generation logic 808 communicates data representing the number and duration of the subframes, and the states of the light modulators during each subframe to the output logic 810.

The output logic 810 also obtains CABC-adjusted backlight illumination levels or intensities for each color subfield (stage 910). For example, the scaling factor, such as $F_1$ or $F_2$, can be passed to the output sequence selection logic 810 to adjust the output intensity of the backlight 714 for the color subfield based on the scaling factor. As discussed above, the light source scaling factor F (whether $F_1$, $F_2$, or some other scaling factor derived in another fashion) can be multiplied with the backlight intensity for each color to determine the CABC-adjusted backlight intensity. For example, if the backlight intensity of a backlight for a subframe prior to processing by the CABC logic 806 were B, then the CABC-adjusted backlight intensity would be B×F. As the light source scaling factor F is less than 1, B×F is less than B. That is, the CABC-adjusted backlight intensity B×F for a subframe would be less than the backlight intensity B before the CABC adjustment.

In some implementations, the output logic 810 may opt to not display, or to drop, potentially imperceptible subframes (stage 912). For example, the reduction in the intensity of the backlight for a subframe to the CABC-adjusted intensity B×F may reduce the backlight intensity to such an extent that the subframe image displayed during the subframe may be imperceptible to the human visual system (HVS). By dropping potentially imperceptible subframes, the control logic 800 can save power associated with loading such imperceptible subframes into the display as well as power associated with illuminating such subframes.

In some implementations, the output logic 810 can compare the CABC-adjusted backlight intensity B×F to a threshold value to determine which subframes can be dropped. For example, if the CABC-adjusted backlight intensity for a subframe is less than the threshold value, the output logic 810 can drop the subframe. In some such implementations, the threshold value can be a HVS perception threshold value. In some other implementations, the output logic 810 can heuristically determine the number of subframes to be dropped within a color subfield by calculating a drop metric D for the color subfield. For example the drop metric D can be determined by:

$$D = \frac{1}{I_{AVG}F}$$

where F is the light source scaling factor determined for the color subfield, as discussed above, and $I_{AVG}$ is the average pixel intensity value of the color subfield prior to CABC adjustment. The output logic 810 can then use the drop metric D to look up the number of subframes to drop from a subframe-drop look-up table (LUT). The subframe-drop LUT can include entries corresponding to a set of drop metric D values, or ranges of D values, where each entry indicates a number of subframes to be dropped. The number of subframes to be dropped for a particular value of drop metric D can be experimentally or analytically determined.

In some implementations, the subframe-drop LUT can be configured such that the number of subframes dropped increases with the increase in the value of the drop metric D. As evident from the expression for D shown above, the drop metric D increases, in part, as a result of decrease in the average pixel intensity value $I_{AVG}$. This means that more subframes will be dropped if the average intensity value, $I_{AVG}$ of the subframes prior to CABC adjustment decreases. The drop metric D also increases, in part, with the decrease in the scaling factor F. Thus, if the scaling factor F is determined by the ratio of the highest pixel intensity value to the maximum allowed pixel intensity value, then more subframes will be dropped if the highest pixel intensity value within the subfield decreases.

In some implementations, despite the reduction in the backlight intensity to the CABC-adjusted backlight intensity B×F, the CABC-adjusted backlight intensity may still be bright enough such that dropping one or more subframes may be imperceptible to the HVS. In such implementations, the drop metric D can be equal to $I_{AVG}/F$, and the subframe-drop LUT can be configured such that the number of subframes dropped increases with the increase in the value of the drop metric D.

As mentioned above, the subframe-drop LUT provides the number of subframes that can be dropped. After determining the number of subframes to be dropped, the output logic 810 can select the particular subframes that can be dropped within a color subfield. In some implementations, the output logic 810 drops the lowest weighted subframes.

Once the subframes to be dropped are determined, the output logic 810 outputs the remaining subframes for display (stage 916). The dropping of the determined number of subframes results in unutilized time within the time allocated to display all the subframes in a color subfield. This unutilized time can be harvested by the output logic 810 to adjust or manipulate various characteristics of the remaining subframes to improve power efficiency and/or overall image quality.

In some implementations, the output logic 810 can use the harvested time to adjust the timing of one or more remaining subframes (stage 914). In some such implementations, the additional time available from dropping one or more subframes of a color subfield may be equally distributed among the remaining subframes of that color subfield. By increasing the amount of time for which the remaining subframes are displayed, the backlight intensity used to illuminate these subframes can be reduced. This reduction in the backlight intensity is in addition to the reduction in the backlight intensity described above with relation to the CABC logic 806. Thus, by further reducing the backlight intensities used to illuminate the remaining subframes, additional power savings can be achieved. In some other such implementations, the output logic 810 may unequally distribute the additional time among the remaining subframes.

In some implementations, the output logic 810 can use the harvested time to display one or more remaining subframes more than once. Displaying subframes more than once can, in some instances, reduce flicker and improve image quality.

In some implementations, the output logic 810 can use the time harvested by dropping one or more subframes of a first color to display a subframe of a different color. For example, a green subframe can be displayed within the additional time available from the dropping of one or more red subframes in a red color subfield. While subframes of colors other than green may be displayed, the human visual system tends to be more sensitive to flicker with respect to the color green. Therefore, displaying of additional green subframes may reduce this flicker.

In some other implementations, the output logic 810 employs error distribution or dithering algorithms. The dropping of subframes can be viewed as a change in the pixel intensity value of a pixel. This change can, in turn, be viewed as an error that is introduced into the pixel intensity value for the affected pixel. The error distribution algorithm, in such implementations, may distribute the error by changing the pixel values of pixels in the vicinity of the affected pixel. For example, if the dropping of subframes results in the pixel intensity value of the affected pixel to decrease by x, then the error distribution algorithm may increase the pixel intensity values of one or more pixels in the vicinity of the affected pixel to result in a combined increase of x. In some implementations, the output logic 810 can use dithering algorithms such as Floyd-Steinberg error diffusion algorithm, block quantization and/or ordered dithering algorithms, and other spatially dithering algorithms, or variants thereof, for spatially dithering an image.

In some implementations, the drop metric D can be calculated by the subframe generation logic 808 instead of, or in addition to, the output logic 810. In such implementations, the subframe generation logic 808 can utilize the drop metric to avoid generating the dropped subframes. For example, the subframe generation logic 808 can refrain from generating lower weighted subframes that, according to the drop metric D, would have been dropped.

Figure 6:
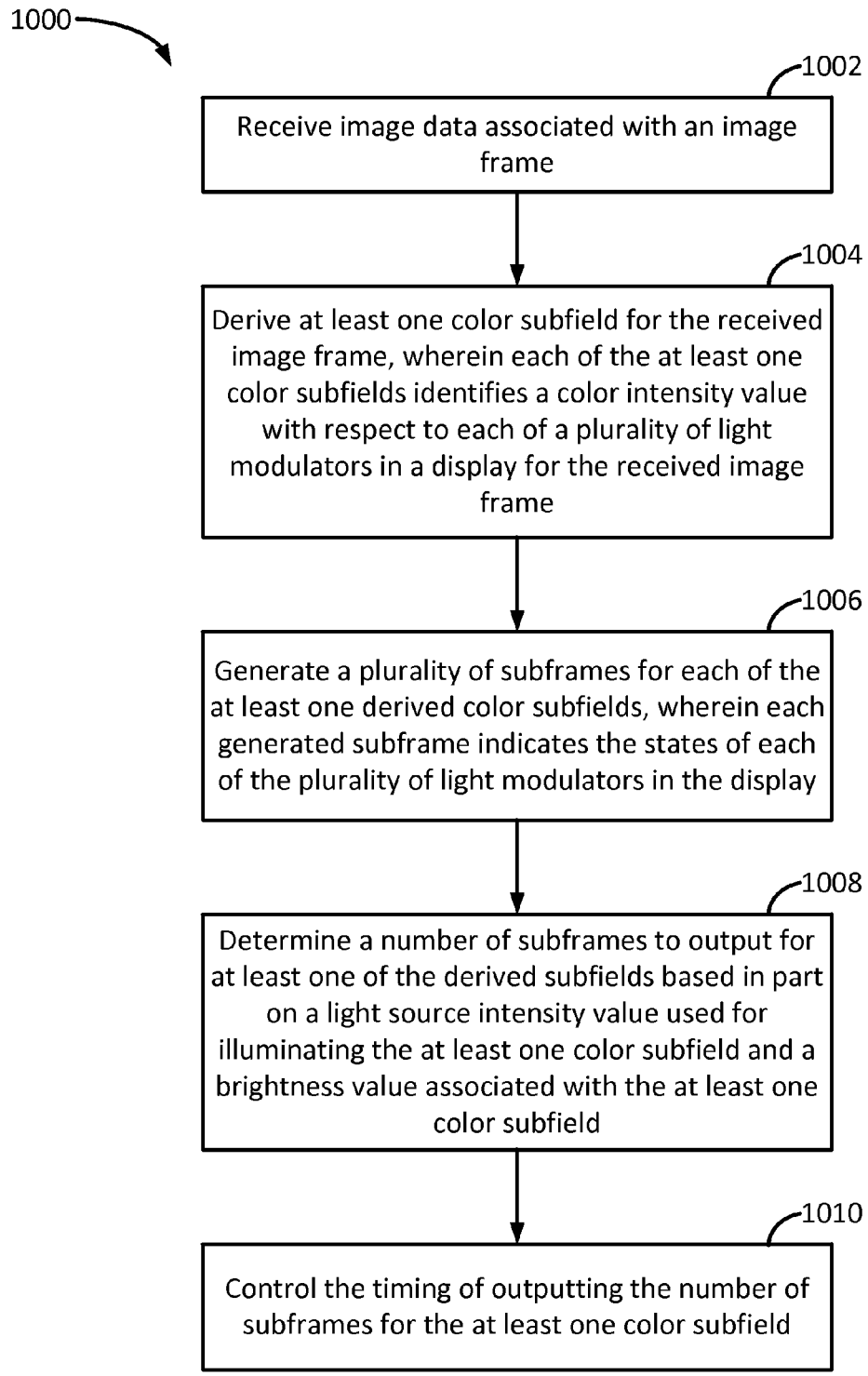
FIG. 6 shows a flow diagram of another example process for generating an image on a display.

FIG. 6 shows an example flow diagram of another example process 1000 for generating an image on a display. In particular, FIG. 6 includes receiving image data associated with an image frame (stage 1002), deriving at least one color subfield for the received image frame, where each of the at least one color subfields identifies a color intensity value with respect to each of a plurality of light modulators in a display for the received image frame (stage 1004), generating a plurality of subframes for each of the at least one derived color subfields, where each generated subframe indicates the states of each of the plurality of light modulator in the display (stage 1006), determining a number of subframes to output for at least one of the derived subfields based in part on a light source intensity value used for illuminating the at least one color subfield and a brightness value associated with the at least one color subfield (stage 1008), and controlling the timing of outputting the number of subframes for the at least one color subfield (stage 1010).

The process 1000 includes receiving image data associated with an image frame (stage 1002). Example of this process stage has been discussed above in relation to FIGS. 3-5. Specifically, as shown in FIG. 3, the control logic 706 receives an image frame in the form an image frame data from the host device 702. Similarly, FIG. 4 shows the input logic 802 receiving image data associated with an image frame. Furthermore, in FIG. 5, stage 902 discusses receiving an image data associated with an image frame.

The process 1000 also includes deriving at least one color subfield for the received image frame, where each of the at least one color subfields identifies a color intensity value with respect to each of a plurality of light modulators in a display for the received image frame (stage 1004). One example of this process stage has been discussed above in relation to FIG. 4. Specifically, the subfield generation logic 804, in one example, derives the set of color subfields by segregating the pixel intensity values (or the color intensity values) for each primary color represented in the received image data (i.e., red, green, and blue). Another example of process stage 1004 has been discussed above in relation to FIG. 5. Specifically, in stage 904 of FIG. 5, color subfields are derived segregating the pixel intensity values for each primary color represented in the received image data. In some implementations, the process stage 1004 may adjust the color intensity values using CABC, as discussed above in relation to the CABC logic 806 in FIG. 4 and stage 906 in FIG. 5. For example, the color intensity values for each pixel may be scaled up to generate CABC-adjusted pixel intensity values. In some implementations, the pixel intensity values can be scaled up by a light source intensity factor F, which in some implementations can be the ratio of the highest pixel intensity value over the maximum intensity value.

The process 1000 also includes generating a plurality of subframes for each of the at least one derived color subfields, where each generated subframe indicates the states of each of the plurality of light modulator in the display (stage 1006). Examples of this process stage have been discussed above in relation to FIG. 4 and FIG. 5 (stage 908). Specifically, the subframe generation logic 808 generates a plurality of subframes for each of the derived subfields based on the CABC-adjusted color intensity values. The subframe generation logic 808 also determines the states of operation of light modulators within each pixel. Data representing the number and duration of the subframes, and the states of the light modulators during each subframe can be communicated to the output logic 810.

The process 1000 further includes determining a number of subframes to output for at least one of the derived subfields based in part on a light source intensity value used for illuminating the at least one color subfield and a brightness value associated with the at least one color subfield (stage 1008). Examples of this process stage have been discussed above in relation to FIG. 4 and FIG. 5 (stage 912). Specifically, the output logic 810 determines the number of subframes to output based on a drop metric D. The drop metric D is a function of the scaling factor F (the light source intensity value) and the average intensity value $B_{AVG}$ (the brightness value) of the subframes in the color subfield. The output logic 810 can then utilize a subframe-drop LUT to determine the number of subframes that can be dropped in the color subfield. Furthermore, as also discussed above in relation to the output logic 810, the process stage 1008 can include reducing the illumination intensity of the backlight by the scaling factor F (the light source intensity value). This reduction in the illumination intensity of the backlight improves the power efficiency of the display device.

The process 1000 further includes controlling the timing of outputting the number of subframes for the at least one color subfield (stage 1010). Examples of this process stage have been discussed above in relation to FIG. 4 and FIG. 5 (stage 916). Specifically, as discussed above, the output logic 810 controls the timing of the remaining subframes in the color subfield. Controlling the timing of the remaining subframes can include harvesting the time that unutilized due to the dropped frames to adjust the timing of the remaining subframes to provide improved power efficiency and/or improved image quality.

Figure 7A:
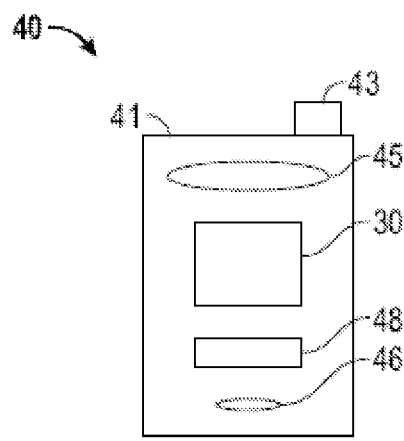
FIGS. 7A and 7B show system block diagrams of an example display device that includes a plurality of display elements.
Figure 7B:
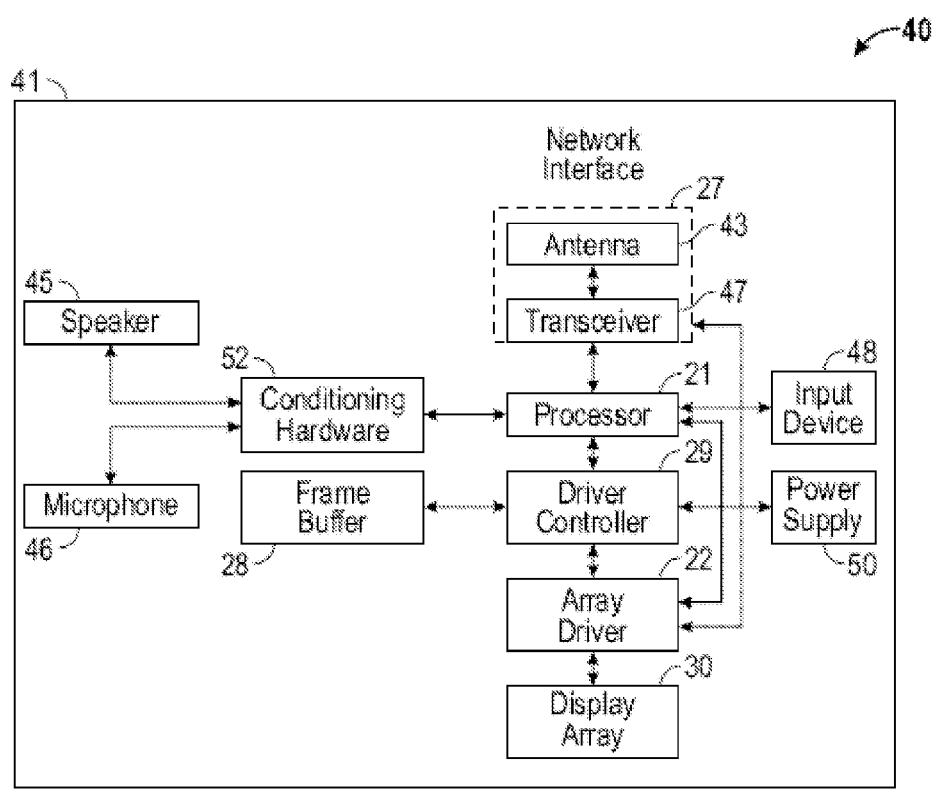

FIGS. 7A and 7B show system block diagrams of an example display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, electroluminescent (EL) displays, OLED, super twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 7B. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 7A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus, comprising:
   an input capable of receiving image data associated with an image frame;
   subfield derivation logic capable of deriving at least one color subfield for the received image frame, wherein each of the at least one color subfields identifies a color intensity value with respect to each of a plurality of light modulators in a display for the received image frame; and
   output logic capable of:
   determining a number of subframes to output for at least one of the derived color subfields, the number of subframes determined based in part on a display light source intensity value used for illuminating the at least one color subfield and a brightness value associated with the at least one derived color subfield; and
   controlling a timing of outputting the number of subframes for the at least one color subfield.

2. The apparatus of claim 1, further comprising content adaptive backlight control (CABC) logic capable of calculating the display light source intensity value for the at least one color subfield and of adjusting the color intensity values identified in the at least one color subfield based on the calculated display light source intensity value.

3. The apparatus of claim 2, wherein the brightness value includes an average color intensity value of the at least one color subfield prior to such color intensity values being adjusted by the CABC logic.

4. The apparatus of claim 2, further comprising subframe generation logic capable of generating a plurality of subframes for each of the at least one derived color subfields, wherein each generated subframe indicates the states of each of the plurality of light modulator in the display.

5. The apparatus of claim 4, wherein the output logic determines the number of subframes to output for the at least one color subfield by determining a number of the generated subframes for the at least one color subfield not to display.

6. The apparatus of claim 5, wherein the output logic further includes error diffusion logic capable of adjusting at least one pixel value within the at least one color subfield based on a determination to not display a subframe.

7. The apparatus of claim 5, wherein determining the number of generated subframes for the at least one subfield not to display includes determining the number heuristically.

8. The apparatus of claim 5, wherein determining the number of generated subframes for the at least one subfield not to display includes determining the number based on a drop metric $D=1(I_{AVG} \times F)$, wherein $I_{AVG}$ is the brightness value associated with the at least one subfield and F is the display light source intensity value.

9. The apparatus of claim 5, wherein determining the number of generated subframes for the at least one subfield not to display includes determining the number based on a drop metric $D=I_{AVG}|F$, wherein $I_{AVG}$ is the brightness value associated with the at least one subfield and F is the display light source intensity value.

10. The apparatus of claim 2, wherein determining the number of subframes based on the display light source intensity value includes determining the number of subframes based on an intensity scaling factor indicative of the display light source intensity value.

11. The apparatus of claim 1, further comprising:
    a display;
    a processor that is capable of communicating with the display, the processor being capable of processing image data; and
    a memory device that is capable of communicating with the processor.

12. The apparatus of claim 11, the display further including:
    a driver circuit capable of sending at least one signal to the display; and
    a controller capable of sending at least a portion of the image data to the driver circuit.

13. The apparatus of claim 11, the display further including:
    an image source module capable of sending the image data to the processor, wherein the image source module comprises at least one of a receiver, transceiver, and transmitter.

14. The apparatus of claim 11, the display further including:
    an input device capable of receive input data and to communicate the input data to the processor.

15. A method of forming an image on a display, comprising:
    receiving image data associated with an image frame;

deriving at least one color subfield for the received image frame, wherein each of the at least one color subfields identifies a color intensity value with respect to each of a plurality of light modulators in a display for the received image frame;

generating a plurality of subframes for each of the at least one derived color subfields, wherein each generated subframe indicates the states of each of the plurality of light modulators in the display;

determining a number of subframes to output for at least one of the derived subfields, the number of subframes determined based in part on a display light source intensity value used for illuminating the at least one color subfield and a brightness value associated with the at least one color subfield; and controlling a timing of outputting the number of subframes for the at least one color subfield.

16. The method of claim 15, further comprising calculating the display light source intensity value for the at least one color subfield and adjusting the color intensity value identified in the at least one color subfield based on the calculated display light source intensity value.

17. The method of claim 16, wherein the brightness value includes an average color intensity value of the at least one color subfield prior to adjusting the color intensity value based on the calculated display light source intensity value.

18. The method of claim 15, wherein determining the number of subframes to output includes determining a number of subframes not to be displayed.

19. The method of claim 18, further comprising applying an error diffusion process to one or more pixel values within the derived subfields based on the determined number of subframes not to be displayed.

20. The method of claim 15, wherein determining the number of subframes based on the display light source intensity value includes determining the number of subframes based on an intensity scaling factor indicative of the display light source intensity value.

21. A non-transitory computer readable storage medium having instructions encoded thereon, which when executed by a processor cause the processor to perform a method for displaying an image, the method comprising:

receiving image data associated with an image frame;

deriving at least one color subfield for the received image frame, wherein each of the at least one color subfields identifies a color intensity value with respect to each of a plurality of light modulators in a display for the received image frame;

generating a plurality of subframes for each of the at least one derived color subfields, wherein each generated subframe indicates the states of each of the plurality of light modulators in the display;

determining a number of subframes to output for at least one of the derived subfields, the number of subframes determined based in part on a display light source intensity value used for illuminating the at least one color subfield and a brightness value associated with the at least one color subfield; and controlling a timing of outputting the number of subframes for the at least one color subfield.

22. The non-transitory computer readable storage medium of claim 21, wherein the instructions, when executed by the processor, cause the processor to calculate the display light source intensity value for the at least one color subfield, and to adjust the color intensity value identified in the at least one color subfield based on the calculated light source intensity value.

23. The computer readable medium of claim 21, wherein the brightness value includes an average color intensity value of the at least one color subfield prior to adjusting the color intensity value based on the calculated display light source intensity value.

* * * * *